(12) United States Patent
Zhang et al.

(10) Patent No.: US 7,151,765 B2
(45) Date of Patent: Dec. 19, 2006

(54) PACKETS FILTERING METHOD IN A WIRELESS NETWORK SYSTEM

(75) Inventors: Yong Zhang, Shanghai (CN); Dai-Shui Ho, Taipei Hsien (TW); Shih-Kuang Tsai, Taipei Hsien (TW)

(73) Assignee: Inventec Appliances Corp., Taipei (TW)

( * ) Notice: Subject to any disclaimer, the term of this patent is extended or adjusted under 35 U.S.C. 154(b) by 889 days.

(21) Appl. No.: 10/065,295

(22) Filed: Oct. 1, 2002

(65) Prior Publication Data

US 2004/0062243 A1   Apr. 1, 2004

(51) Int. Cl.
*H04Q 7/24* (2006.01)
(52) U.S. Cl. .......................... 370/338; 370/392; 370/400
(58) Field of Classification Search ...................... None
See application file for complete search history.

(56) References Cited

U.S. PATENT DOCUMENTS 5,339,316 A * 8/1994 Diepstraten ................. 370/401
5,490,258 A * 2/1996 Fenner ........................... 711/1
5,570,366 A * 10/1996 Baker et al. ................. 370/312

OTHER PUBLICATIONS

King, An IEEE 802.11 Wireless LAN Security White Paper, pp. 1-18, Oct. 2001.*

* cited by examiner

*Primary Examiner*—Frank Duong
(74) *Attorney, Agent, or Firm*—Winston Hsu

(57) ABSTRACT

Packets filtering method in a wireless network system. The method includes following steps: using a first node of the wireless network system to transmit a packet to a switch of the wireless network system, using a receiving module of the switch to receive the packet, using an identifying module of the switch to sequentially compare an address information of the packet with a plurality of address data of an address list, and using a transmitting module of the switch to transmit the packet to a second node via a local area network if the address information of the packet corresponds to one of the address data of the address list.

3 Claims, 4 Drawing Sheets

US 7,151,765 B2

PACKETS FILTERING METHOD IN A WIRELESS NETWORK SYSTEM

BACKGROUND OF THE INVENTION

1. Field of the Invention

The present invention relates to a method for filtering packets in a wireless network system, and more particularly, to a method for filtering the packets by using the address code of a network interface card in the packet.

2. Description of the Prior Art

In recent years, along with the fast development of wireless networks, many significant data are being delivered through the networks. Therefore, safety and network transmission speed are increasingly important issues.

The safety protection in the network of the prior art is mainly achieved through the encryption of the IEEE 802.11 wired equivalent privacy (WEP) protocol. That is, the same set of WEP keys will be used from the user client to the access point to encrypt the document, and the encrypted document can be transmitted through the network system.

Please refer to FIG. 1. FIG. 1 is a schematic diagram showing the transmission of a document 12 by a WEP key system 10 of the prior art. A first port 18 of the WEP key system 10 comprises an encryption module 14 for encrypting the document, and a decryption module 16 for decrypting the document. A second port 28 of the WEP key system 10 also comprises an encryption module 24 and a decryption module 26. When a user would like to deliver the document 12 from the first port 18 to the second port 28 and to conceal the contents of the document from a third party, the user can make use of the WEP key system 10 to secretly transmit the document 12. The instructions of the secret transmission by the WEP key system 10 are described as follows: the user first makes use of the encryption module 14 to encrypt the document 12 to a ciphered text 20 with a WEP key, then the user can make use of a public gateway 19 to transmit the ciphered text 20 to the second port 28. When the ciphered text 20 is transmitted to the second port 28, the decryption module 26 will decrypt the ciphered text 20 with the WEP key. Afterwards, the user at the second port 28 can realize the contents of the document 12. Likewise, when the user at the first port 18 receives the ciphered text transmitted from the second port 28 and encrypted with the WEP key, the user can make use of the decryption module 16 to decrypt the ciphered text with the WEP key. In the process of transmission of the ciphered text, if a hacker in the network would like to cut and take the ciphered text 20, the hacker cannot readout the concealed contents of the ciphered text 20 whether the hacker obtains the ciphered text 20 or not since the hacker does not have the WEP key. Therefore, the WEP key system 10 can provide the function of secretly delivering documents.

However, the WEP key system 10 contains at least the following three defects:

1) The administrator of the network has to carry the WEP key to a plurality of computers to set the secret codes, and the procedure wastes time and manpower and easily lets the WEP key be stolen or lost.

2) If the administrator would like to shorten the setting time, a multi-user secret-code-setting task can be performed at the same time. However, the secret code will be revealed to many people, and will not be concealed.

3) The document-secrecy-method with the WEP key is to encrypt each of the transmitted documents and to decrypt each of the received documents. Since the value of the WEP key is usually very big(128 bits), the tasks of encryption and decryption usually consume a lot of time.

SUMMARY OF THE INVENTION

It is therefore a primary objective of the claimed invention to provide a method for improving both the safety and speed during the transmission of data.

According to the claimed invention, a method for filtering packets in a wireless network system is disclosed. The wireless network system comprises a wireless access point wirelessly connected to a plurality of first nodes, and each of the first nodes delivers data to the access point by transmitting packets. Each of the packets has a header for recording a first address code, and the access point comprises a first list for storing a plurality of first addresses, a receiving module for receiving the packets transmitted from the first nodes, an identifying module for comparing the first address codes of the packets received from the receiving module with the first addresses of the first list, and a transmitting module for delivering data to a plurality of second nodes via a local area network. The method comprises:

(a) Utilizing one of the first nodes to transmit a first packet to the access point;

(b) Utilizing the receiving module to receive the first packet transmitted from the first node;

(c) Utilizing the identifying module to compare the first address code of the first packet with the first addresses of the first list; and (d) Utilizing the transmitting module to transmit the first packet to one of the second nodes if the first address code of the first packet corresponds to one of the first addresses of the first list.

These and other objectives of the present invention will no doubt become obvious to those of ordinary skill in the art after reading the following detailed description of the preferred embodiment, which is illustrated in the various figures and drawings.

DETAILED DESCRIPTION

All the data within the wireless network system are delivered in the form of a packet. In the standard definition of IEEE 802.11, the media access control layer (MAC layer) transmits the packet by the way of the carrier sense multiple access with collision avoidance (CSMA/CA), namely the design of "saying after listening". Before a transmitting end, which can be a user or an access point, transmits a packet to a receiving end, which can be a user or an access point, the network system should detect if there is any idle channel in the wireless network system. The existence of an idle channel indicates there is no packet delivered in that channel at this moment. The detecting procedure ensures collision avoidance during the transmission of the packet in the idle channel. If the result of the idle-channel detection is "Yes", the transmitting end can make use of the idle channel to transmit the packet. On the contrary, if the result of the idle-channel detection is "none", it represents that all the channels in the wireless network system are occupied at this moment. Thus the transmitting end has to temporally wait and checks for an idle channel again after a period of waiting time. The period of waiting time can be called as "backoff". After the transmitting end waits for one or a plurality of backoffs, if an idle channel appears, the transmitting end can make use of that idle channel to transmit the packet. However, in the above-mentioned process, the packet also probably collides with other packet in the idle channel. Therefore, for avoiding the loss of data due to the collision or interruption of the packet in the process of delivering the packet, the receiving end will deliver an acknowledge signal ACK to the transmitting end immediately after the receiving end receives the packet from the transmitting end successfully. If the transmitting end does not receive the acknowledge signal ACK from the receiving end for a certain period of time after the transmitting end makes use of an idle channel to transmit the packet to the receiving end, the transmitting end will know that the previously delivered packet is not transmitted to the receiving end successfully. Therefore, the transmitting end has to wait for one or a plurality of backoffs for another idle channel to transmit the packet.

Figure 1:
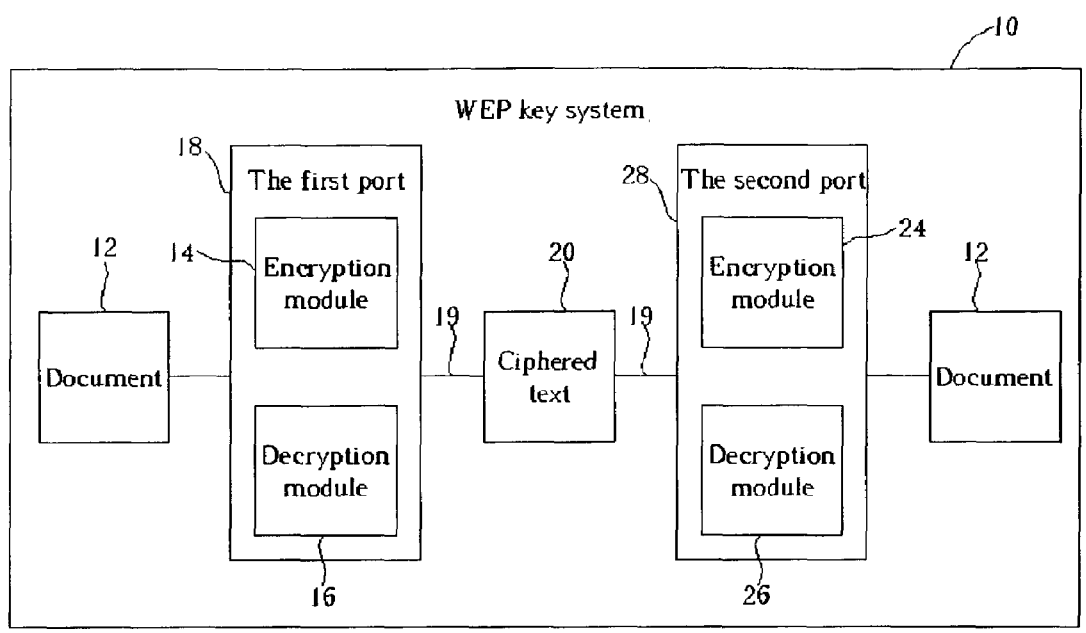
FIG. 1 is a schematic diagram of a WEP key system of the prior art.
Figure 2:
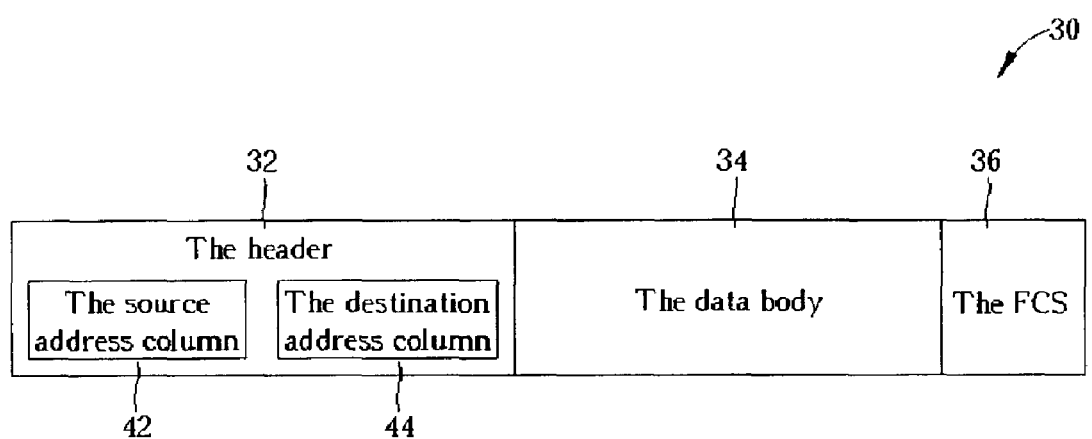
FIG. 2 is a schematic diagram of a packet of the present invention.

After the receiving end successfully receives all the packets transmitted from the transmitting end, the receiving end can integrate all kinds of data inside of the packets into an integrated data set, or deliver the packets to the other receiving end. Please refer to FIG. 2. FIG. 2 is a schematic diagram of a packet 30 used in the method for filtering packets in a wireless network system of the present invention. The packet 30 comprises a header 32, a data body 34, and an FCS 36. The header 32 comprises a source address column 42 used to indicate the source address of the packet 30 that comprises the header 32, and a destination address column 44 used to indicate the destination address by which the packet 30 can be transmitted to the destination. The data body 34 stores the data of different lengths. The main function of the FCS 36 lies in the inspection of packet 30 in the process of transmission to avoid the occurrence of bugs. The method for inspection adopts the skill of Cyclic Redundancy Check (CRC32).

Figure 3:
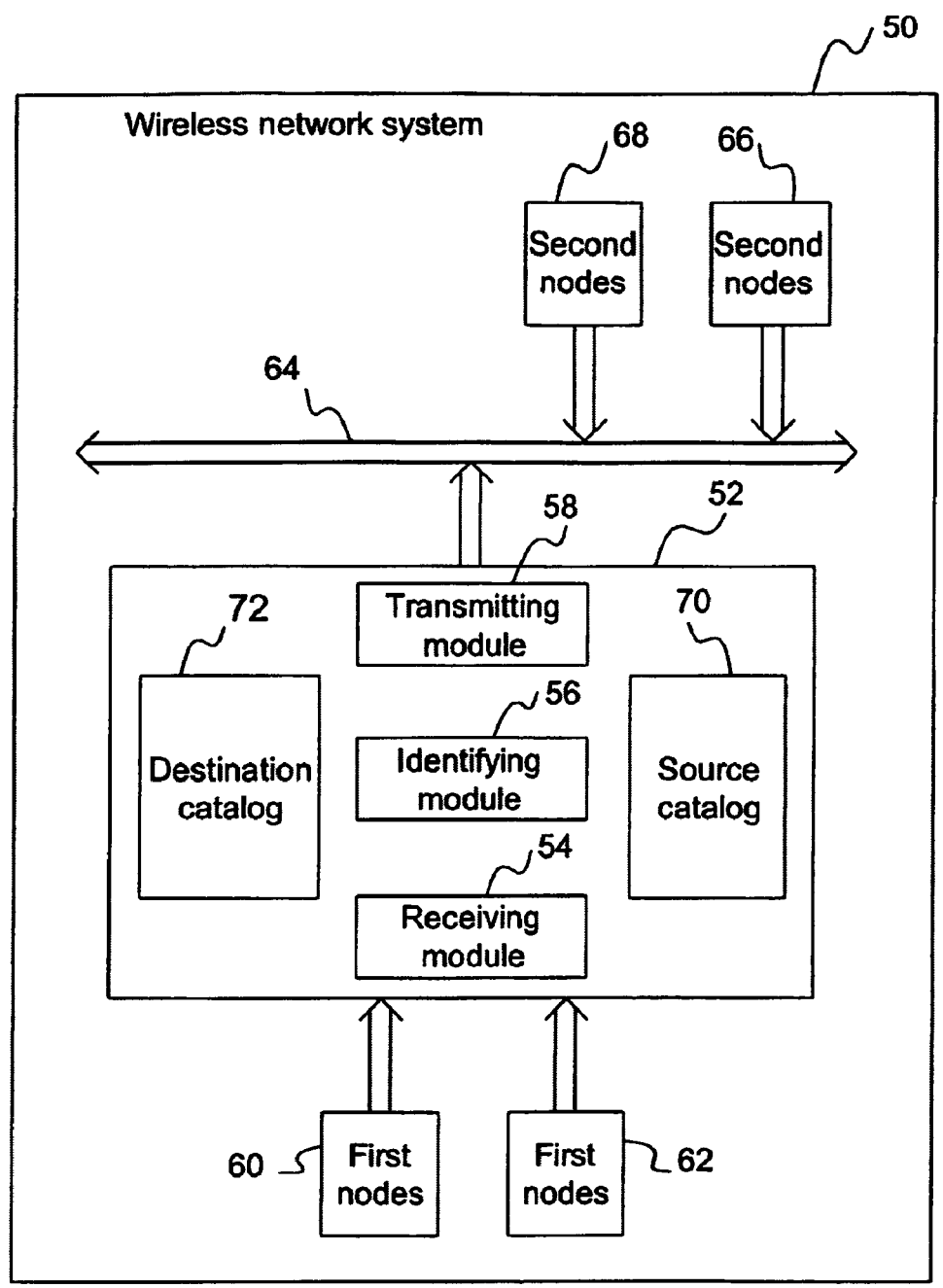
FIG. 3 is a schematic diagram of a wireless network system of the present invention

Please refer to the FIG. 3. FIG. 3 is a schematic diagram of a wireless network system 50 used in the method for filtering packets in the wireless network system of the present invention. The wireless network system 50 comprises a wireless access point 52 in the media access control layer (MAC layer) 52 of the wireless network system 50, and a plurality of first nodes 60 in the physical layer of the wireless network system 50. The system wirelessly transmits packet 30 so as to deliver the data to the wireless access point 52. A source catalog 70 is installed in the wireless access point 52 for storing a plurality of sets of source address codes, and a destination catalog 72 is installed for storing a plurality of sets of destination address codes. The wireless access point 52 also comprises a receiving module 54, an identifying module 56, and a transmitting module 58. The receiving module 54 is used to receive a plurality of the packets transmitted from the first nodes 60 and 62. The identifying module 56 is used to compare the source address codes and the destination address codes inside the packets received by the receiving module 54 with a plurality of sets of the source address codes inside the source catalog 70 of the wireless access point 52 and a plurality of sets of the destination address codes inside the destination catalog 72. The transmitting module 58 delivers the data via a local area network 64 to a plurality of second nodes 66 and 68 in the MAC layer of the wireless network system 50.

As each piece of network equipment, such as a network interface card or a router, has a specific IP address, the source address code and the destination address codes inside the header 32 of the packet 30 can be set to be equal to the IP address of any network equipment. When the first node 60 would like to transmit the packet through the wireless network system 50, the administrator of the wireless network system 50 can ask the first node 60 to register in advance. According to the registering procedure, the IP address of the network equipment in the first node 60 will be stored in the source catalog 70 or the destination catalog 72 of the wireless access point 52 in advance. The wireless access point 52 also may auto-search the IP address of the network equipment in the first node 60 or auto-record the IP address to the source catalog 70 or the destination catalog 72 of the wireless access point 52. After that, when the network equipment of the first node 60 wirelessly connects to the wireless access point 52, the wireless access point 52 will read the relevant IP addresses from the packet 30 transmitted from the first node 60. According to a certain identifying procedure in the wireless access point 52, then the identifying module 56 will compare the IP address of the network equipment in the first node 60 read by the wireless access point 52 with all the address codes inside the destination catalog 72 or the source catalog 70 of the wireless access point 52 to see if there is any identical address. If the result is "Yes", the consumer is legal and the packet is allowed to pass.

If the result shows "No", the consumer is not legal and the packet is not allowed to pass.

Figure 4:
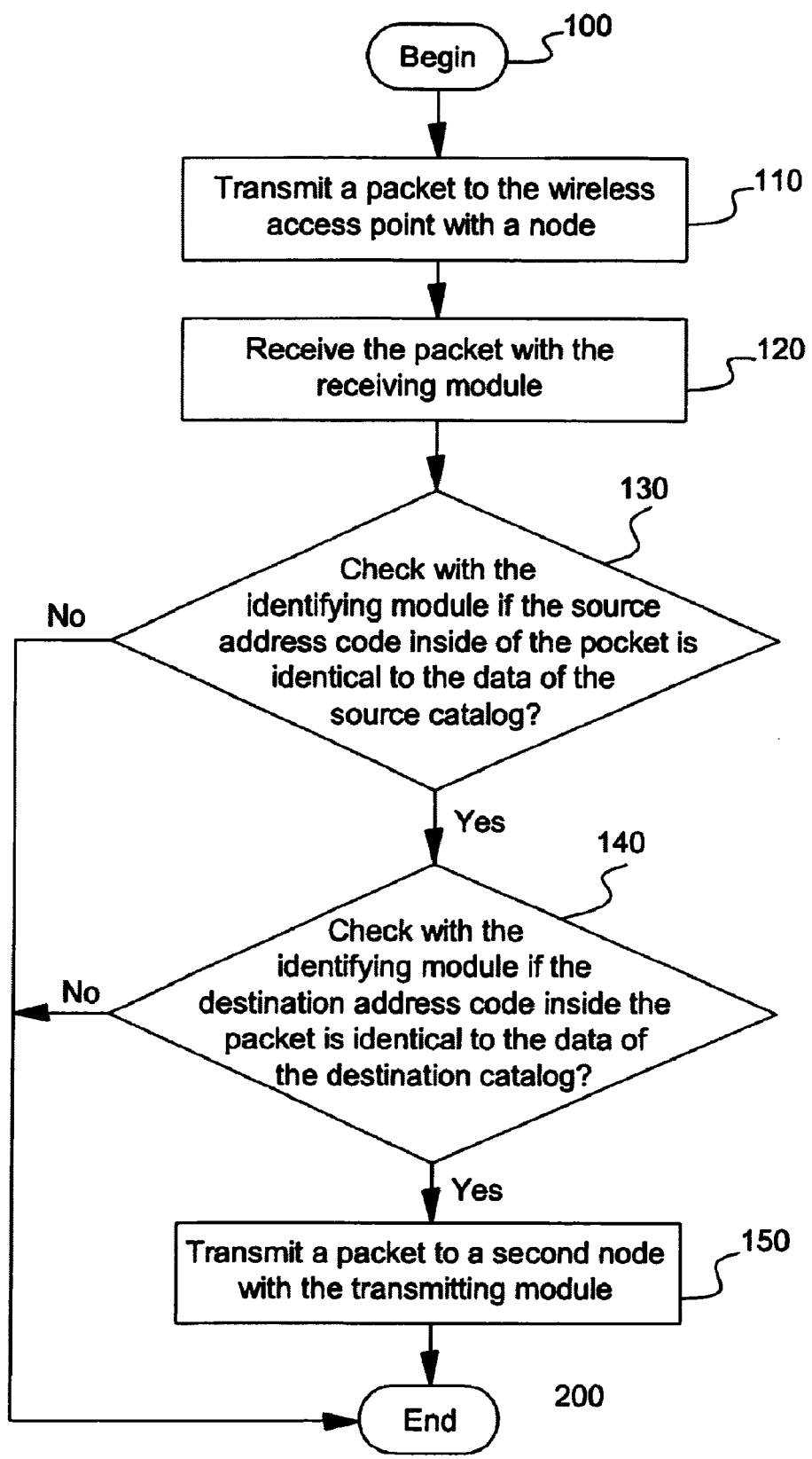
FIG. 4 is a flowchart illustrating methods of the present invention.

Please refer to the FIG. 4. FIG. 4 is a flowchart of the methods for filtering the packet of the present invention. The present invention comprises the following steps:

Step 100:

Begin; (At this moment, the source catalog 70 and the destination catalog 72 inside the wireless access point 52 are stored with a plurality of sets of the address codes, and these address codes are the IP addresses of the network equipments of the legal users registered by the administrator of the wireless network system 50.)

Step 110:

Make use of one of a plurality of the first nodes to deliver the packet 30 to the wireless access point 52; (The packet 30 comprises the IP address of the network equipment in the first node 30 and the destination address codes inside the packet 30.)

Step 120:

Make use of the receiving module 54 of the wireless access point 52 to receive the packet 30;

Step 130:

Make use of the identifying module 56 of the wireless access point 52 to compare the source address code inside the packet 30 with all the source address codes inside the source catalog 70 of the wireless access point 52 to see if there is any identical address code. If the result is "Yes", the procedure goes to step 140. If the result shows "No", the procedure goes to step 200;

Step 140:

Make use of the identifying module 56 of the wireless access point 52 to compare the destination address code inside the packet 30 with all the destination address codes inside the destination catalog 72 of the wireless access point 52 to see if there is any identical address code. If the result is "Yes", the procedure goes to step 150. If the result shows "No", the procedure goes to step 200;

Step 150:

According to the destination address inside of the packet 30, make use of the transmitting module 58 to deliver the packet 30 to the second node matching the destination address in the local area network; (The user of the first node for delivering the packet 30 should be the registered user of the wireless network system 50, and the address, where the packet 30 is transmitted to, should be the address allowed for transmission in the wireless network system 50. The IP address of the network equipment in the second node 30 should be identical to the destination address inside the packet 30.)

Step 200: End.

Step 130 or step 140 can be omitted in the method for filtering packets in the wireless network system 50 of the present invention. If step 130 is omitted in the method of the invention, the identifying module 56 of the wireless access point 52 only compares the destination address codes inside the packet 30 with all the destination address codes inside the destination catalog 72 of the wireless access point 52 to see if there is any identical address code. That is, no matter what the destination address inside the packet 30 is, the transmitting module 58 of the wireless access point 52 will transmit the packet 30 to the corresponding node according to the destination address of the packet 30, as long as the destination address inside the packet 30 is identical to any one of the destination address codes in the destination catalog 72. If step 140 is omitted in the method of the invention, the identifying module 56 of the wireless access point 52 only compares the source address codes inside the packet 30 with all the source address codes inside the source catalog 72 of the wireless access point 52 to see if there is any identical address code. That is, no matter what the destination address inside the packet 30 is, the transmitting module 58 of the wireless access point 52 will transmit the packet 30 to the corresponding node according to the destination address of the packet 30, as long as the source address inside the packet 30 is identical to any one of the source address codes in the source catalog 70.

In contrast to the prior art of encryption of the document with a WEP key system, the method of the present invention for filtering packets will increase the speed of transmission and maintain the security of the transmitted document because the method only checks the source address code or the destination address code in the header of the packet without the complicated operations, such as the calculations of encryption and decryption, toward the data body of the packet. Furthermore, since the main steps of the present invention, such as the procedure of data identification by the identifying module, can be achieved with a hardware structure, the efficiency of the present invention can be greatly raised.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for filtering packets in a wireless network system, the wireless network system comprising a wireless access point wirelessly communicating with a plurality of first nodes, each of the first nodes delivering data to the access point by transmitting packets, each of the packets having a header for recording a source address code and a destination address code, the access point comprising a first list for storing a plurality of first addresses, a second list for storing a plurality of second addresses, a receiving module for receiving the packets transmitted from the first nodes, an identifying module, and a transmitting module for delivering data to a plurality of second nodes via a local area network, the method comprising:

(a) utilizing one of the first nodes to transmit a first packet to the access point;
   (b) utilizing the receiving module to receive the first packet transmitted from the first node;
   (c) utilizing the identifying module to compare the source address code of the first packet with the first addresses of the first list and to compare the destination address code of the first packet with the second addresses of the second list; and
   (d) utilizing the transmitting module to transmit the first packet to one of the second nodes if the source address code of the first packet corresponds to one of the first addresses of the first list and the destination address code of the first packet corresponds to one of the second addresses of the second list.

2. The method of claim 1 wherein the access point is positioned in a medium access control (MAC) layer of the wireless network system.

3. The method of claim 1 wherein the first nodes and the second nodes are positioned in a physical layer of the wireless network system.

* * * * *